US011884082B2

(12) United States Patent
Hattori

(10) Patent No.: US 11,884,082 B2
(45) **Date of Patent: *Jan. 30, 2024**

(54) MOTOR CONTROL DEVICE AND THERMAL PRINTER

(71) Applicant: TOSHIBA TEC KABUSHIKI KAISHA, Tokyo (JP)

(72) Inventor: Naoyuki Hattori, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,429

(22) Filed: Dec. 23, 2022

(65) Prior Publication Data

US 2023/0125594 A1 Apr. 27, 2023

Related U.S. Application Data

(63) Continuation of application No. 17/366,658, filed on Jul. 2, 2021.

(30) Foreign Application Priority Data

Sep. 23, 2020 (JP) ................................ 2020-158961

(51) Int. Cl.
*B41J 2/335* (2006.01)

(52) U.S. Cl.
CPC .................................. *B41J 2/3352* (2013.01)

(58) Field of Classification Search
CPC ...................................................... B41J 2/3352
See application file for complete search history.

(56) References Cited

U.S. PATENT DOCUMENTS 5,191,357 A * 3/1993 Ono .......................... B41J 2/17 347/186
2003/0142346 A1 7/2003 Shirotori
2007/0024692 A1 2/2007 Miura et al.
2017/0020034 A1* 1/2017 Kondo ............... H05K 7/20909
2022/0088940 A1* 3/2022 Hattori ................... B41J 2/3352

* cited by examiner

*Primary Examiner* — Yaovi M Ameh
(74) *Attorney, Agent, or Firm* — Kim & Stewart LLP

(57) ABSTRACT

According to one or more embodiments, a motor driving device includes a first substrate, a motor drive circuit, a first temperature sensor, a second temperature sensor, and a controller. The first substrate is connected to a motor via a first wiring. The motor drive circuit is provided on the first substrate. The first temperature sensor is provided on the first substrate and detects a first temperature of the motor drive circuit. The second temperature sensor detects a second temperature of an ambient environment where the motor is being used. The controller controls the motor drive circuit based on the first temperature from the first temperature sensor and the second temperature from the second temperature sensor.

16 Claims, 8 Drawing Sheets

FIG. 8

| Temperature | Head energization time |
|---|---|
| 30 °C ≤ TR | A |
| 10 °C ≤ TR < 30 °C | B |
| TR < 10 °C | C |

FIG. 9

| Temperature | Threshold value |
|---|---|
| 50 °C ≤ TR | V |
| 40 °C ≤ TR < 50°C | W |
| 30 °C ≤ TR < 40°C | X |
| 25 °C ≤ TR < 30 °C | Y |
| TR < 25°C | Z |

MOTOR CONTROL DEVICE AND THERMAL PRINTER

CROSS-REFERENCE TO RELATED APPLICATIONS

This application is a continuation of U.S. patent application Ser. No. 17/366,658, filed on Jul. 2, 2021, which is based upon and claims the benefit of priority from Japanese Patent Application No. 2020-158961, filed on Sep. 23, 2020, the entire contents of each of which are incorporated herein by reference.

FIELD

Embodiments described herein relate generally to a motor control device and a thermal printer.

BACKGROUND

Conventionally, in an electronic apparatus with a motor, the motor is controlled so as not to exceed some rated temperature that corresponds to a usage limit temperature for the motor. In such an electronic apparatus, the temperature of the motor is detected by a temperature sensor, such as a thermistor, and when the detected temperature reaches or exceeds a predetermined temperature, the motor is stopped.

A thermal printer with a sheet conveyance motor is known. In such a thermal printer, a temperature sensor is generally attached to the sheet conveyance motor via a heat conductive member. The temperature sensor is electrically connected to a circuit board. The motor is stopped when the temperature detected by the temperature sensor reaches or exceeds a predetermined temperature. There has also been known a configuration of a thermal printer in which the temperature sensor is directly attached to the motor rather than via a heat conductive member. In such a case, the temperature sensor and the circuit board can be connected by a flexible substrate board.

According to such conventional techniques, the temperature of the motor is detected by a temperature sensor that is off the circuit board by some distance. Therefore, it is necessary to connect the temperature sensor to the circuit board via a flexible substrate board or the like, which causes an increase in cost of the thermal printer.

BRIEF DESCRIPTION OF THE DRAWINGS

FIG. 8 depicts an example data configuration of a head energization table according to an embodiment.

FIG. 9 depicts an example data configuration of a threshold table according to an embodiment.

DETAILED DESCRIPTION

In general, according to one embodiment, a motor driving device includes a first substrate, a motor drive circuit, a first temperature sensor, a second temperature sensor, and a controller. The first substrate is connected to a motor via a first wiring. The motor drive circuit is provided on the first substrate. The first temperature sensor is provided on the substrate and detects a first temperature of the motor drive circuit. The second temperature sensor detects a second temperature of an ambient environment where the motor is being used. The controller controls the motor drive circuit based on the first temperature from the first temperature sensor and the second temperature from the second temperature sensor.

Certain example embodiments of a motor control device and a thermal printer will be described with reference to the accompanying drawings. In the example embodiments, a motor control device or a motor driving device for a paper conveyance motor of a thermal printer will be described as one example of a control device in an electronic apparatus, but the present disclosure is not limited thereto.

Figure 1:
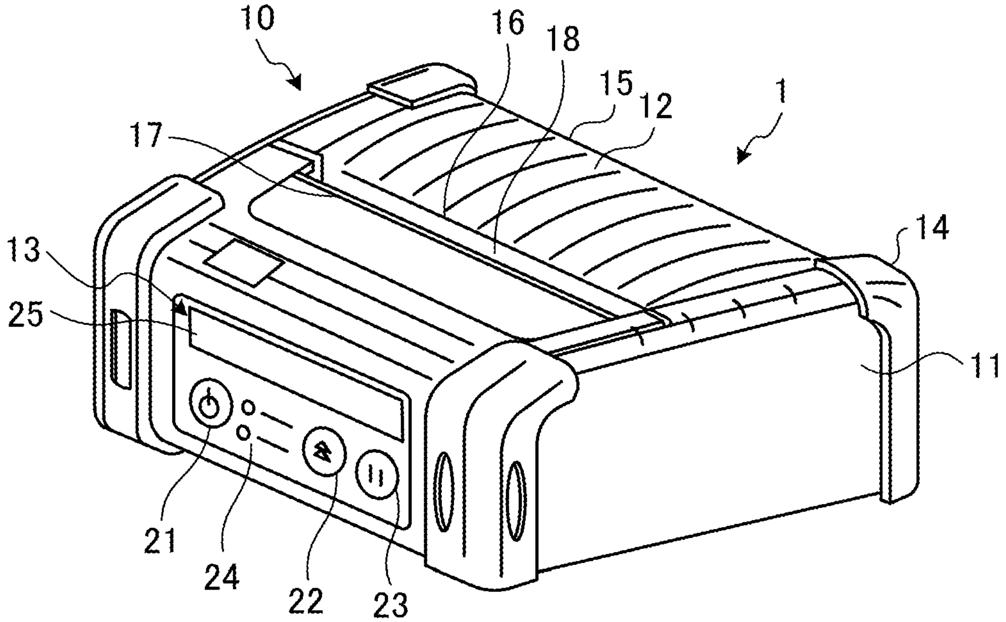
FIG. 1 depicts a thermal printer in a perspective view according to an embodiment.

FIG. 1 depicts an external appearance of a thermal printer 1 in a perspective view according to the present exemplary embodiment. The thermal printer 1 is a portable thermal printer that can be carried and used by a user and is driven by a battery. The thermal printer 1 includes a housing 10 having a rectangular parallelepiped shape.

The housing 10 includes a main body 11, a cover 12, a display/operation unit 13, and a bumper 14. The main body 11 includes a sheet storage portion having an open upper surface. The sheet storage portion detachably stores a sheet P (see FIG. 2) which is a printing medium of the thermal printer 1. The sheet P is, for example, thermosensitive paper, label paper in which a plurality of labels formed of thermosensitive paper are attached to a mount at predetermined intervals, or the like, and is wound in a roll shape. The main body 11 accommodates various components of the thermal printer 1 including a sheet conveyance motor or a motor 50 (see FIG. 2) to convey the sheet P, a thermal head 30 (see FIG. 2) to perform printing, a control board, and the like.

The cover 12 is rotatably and pivotally supported by a rear end part 15 of the main body 11. The cover 12 rotates to open and close the upper surface opening of the sheet storage portion. As shown in FIG. 1, in a state in which the cover 12 is closed, a sheet discharge port 18 for discharging a printed sheet P is formed between a front edge 16 of the cover 12 and one side edge 17 of the upper surface opening formed in the main body 11.

The display/operation unit 13 includes a power switch 21, a paper feed button 22 for a user to instruct paper feed or the like, a pause button 23 for a user to instruct pause of paper feed or the like, an indicator 24 for notifying a user of the state of the battery, and a display unit 25 formed of, for example, a Liquid Crystal Display (LCD) or the like.

The bumper 14 is provided at each of four corners of the main body 11 and protrudes outward from the main body 11. The bumper 14 is made of an elastic material such as rubber. For example, when a user drops the thermal printer 1 while carrying the thermal printer 1, the bumper 14 functions as a cushioning material to prevent the housing 10 from being damaged.

Figure 2:
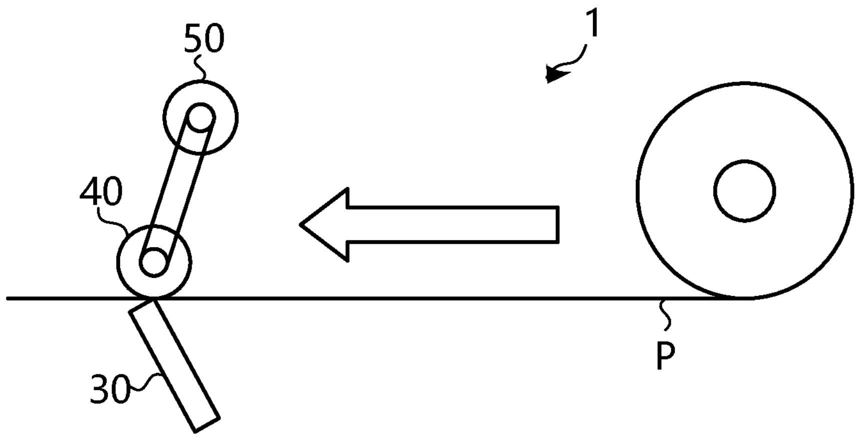
FIG. 2 is a diagram schematically illustrating a printing mechanism of a thermal printer according to an embodiment.

FIG. 2 is a diagram schematically illustrating a printing mechanism of the thermal printer 1. Printing is performed on the sheet P by the thermal head 30 while the sheet P is sandwiched between the thermal head 30 and a platen 40.

The thermal head 30 is accommodated in the main body 11 of the housing 10. The thermal head 30 is, for example, a line thermal head having a plurality of heat generation elements arranged in a line in a main scanning direction perpendicular to a conveyance direction of the sheet P indicated by an arrow in FIG. 2. The heat generation elements generate heat by energization, and each corresponds to a pixel of one dot.

The platen 40 is formed in a roller shape and is attached to the cover 12. The platen 40 is provided at a position where the platen 40 is pressed against the thermal head 30 in a state where the cover 12 is closed. A driven gear that rotates integrally with the platen 40 is provided on one end side in the axial direction of the platen 40. The main body 11 is provided with a driving gear driven by the motor 50 at a position corresponding to the driven gear. The driven gear meshes with the driving gear when the cover 12 is closed. Accordingly, the platen 40 is rotationally driven by the motor 50 in a state where the cover 12 is closed and conveys the sheet P in the direction of the arrow shown in FIG. 2. Thus, the motor 50 functions as a motor that conveys the sheet P. Since FIG. 2 schematically shows that the platen 40 is driven by the motor 50, the motor 50 is shown at a position different from the actual position.

Figure 3:
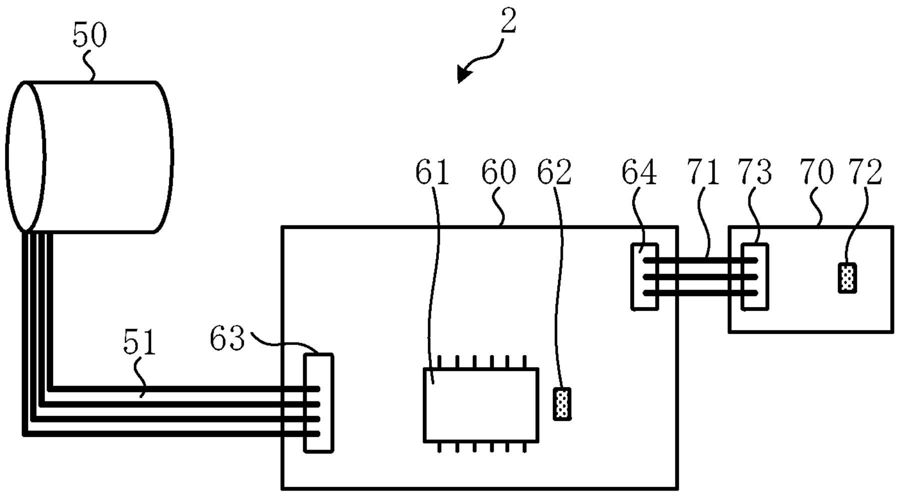
FIG. 3 is a diagram schematically illustrating a motor driving device of a thermal printer according to an embodiment.

FIG. 3 is a diagram schematically showing a motor driving device 2 of the thermal printer 1. The motor driving device 2 is one example of a motor control device. The motor driving device 2 controls the motor 50 and includes a main substrate (or a main board) 60 and a thermistor substrate (or a thermistor board) 70. The motor driving device 2 includes a first wiring 51 that connects one end of the main substrate 60 to the motor 50, and a second wiring 71 that connects the opposite end of the main substrate 60 to the thermistor substrate 70. The motor 50, the main substrate 60, and the thermistor substrate 70 are accommodated within the housing 10. In one example, the thermistor substrate 70 is provided at a location that is not easily affected by the temperature of the motor 50 and the main substrate 60.

The motor 50 is, for example, a permanent magnet (PM) motor using one or more permanent magnets as a rotor and rotates the platen 40 to convey the sheet P in the thermal printer 1. The first wiring 51 includes, for example, a plurality of wires and cables and causes a necessary current to flow to the motor 50.

The main substrate 60 includes a motor driver Integrated Circuit (IC) 61, a first thermistor 62, a first terminal portion 63, and a second terminal portion 64. Although not specifically depicted, the main substrate 60 includes various electronic components necessary for controlling the thermal printer 1 in addition to a head drive circuit 65 (see FIG. 7) for controlling the thermal head 30 and electronic components constituting a controller of the thermal printer 1.

The motor driver IC 61 includes a circuit for driving the motor 50 and is one example of a motor drive circuit. Since the current corresponding to the current flowing through the motor 50 flows through the motor driver IC 61, a temperature rise due to current consumption of the motor driver IC 61 has a correlation with a temperature rise due to current consumption of the motor 50.

The first thermistor 62 is provided in the vicinity of the motor driver IC 61 and detects a temperature of the motor driver IC 61. The first thermistor 62 is an example of a first temperature sensor configured to detect a temperature of the motor drive circuit. Since the temperature rise of the motor driver IC 61 has a correlation with the temperature rise of the motor 50, the temperature of the motor 50 can be estimated based on the temperature detected by the first thermistor 62. Therefore, the first thermistor 62 indirectly detects the temperature of the motor 50.

The first terminal portion 63 is provided on one end side of the main substrate 60 and connects the main substrate 60 to the plurality of wires and cables of the first wiring 51 connected to the motor 50. The second terminal portion 64 is provided on another end side of the main substrate 60 and connects the main substrate 60 to the plurality of wires and cables of the second wiring 71 connected to the thermistor substrate 70.

The thermistor substrate 70 includes a second thermistor 72 and a terminal portion 73. The second thermistor 72 is provided on one end side of the thermistor substrate 70 and detects a temperature of an ambient environment of the motor driving device 2. The second thermistor 72 is an example of a second temperature sensor being provided in a housing of an electronic apparatus, such as the housing 10 of the thermal printer 1, and configured to detect a temperature of an ambient environment where a motor, such as the sheet conveyance motor 50, is being used. The terminal portion 73 is provided on another end side of the thermistor substrate 70 and connects the thermistor substrate 70 to the plurality of wires and cables of the second wiring 71 connected to the main substrate 60.

Figure 4:
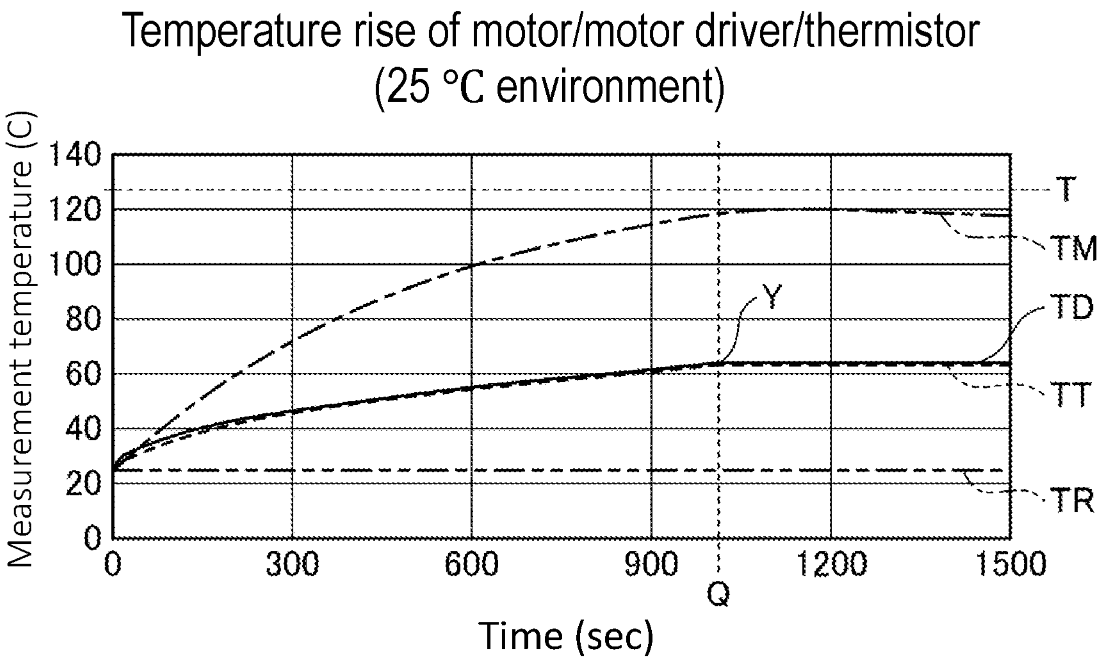
FIG. 4 depicts temperature changes in a thermal printer according to an embodiment under one ambient temperature environment.

FIG. 4 shows example temperature changes of some components of the thermal printer 1 in a case where the temperature of a room where the thermal printer 1 is being used is 25° C. This room temperature is one example of the ambient environment temperature. The vertical axis indicates measured temperature in degrees Celsius (C), and the horizontal axis indicates operation time (running time) of the motor 50 in seconds. The label "TM" indicates the temperature of the motor 50, the label "TD" indicates the temperature of the motor driver IC 61, the label "TT" indicates the temperature of the first thermistor 62, and the label "TR" indicates the temperature of the second thermistor 72. In the present embodiment, since the first thermistor 62 accurately detects the temperature of the motor driver IC 61, the curves for TD and TT will generally be substantially the same as each other.

As time elapses after the motor 50 starts operating, both the temperature TM (of the motor 50) and the temperature TT (of the first thermistor 62) (and the temperature TD of the motor driver IC 61) gradually rise from the initial, ambient environment temperature. The temperature rise of the motor 50 has a correlation with that of the motor driver IC 61, and the gradient of the temperature rise of the motor 50 is greater than that of the motor driver IC 61. In this situation, the motor driving device 2 performs control such that the temperature TM does not reach or exceed a predetermined rated temperature T. Since the second thermistor 72 is provided at a position not readily affected by the temperature changes of either the motor 50 or the motor driver IC 61, the temperature TR as detected by the second thermistor 72 is substantially constant even when the motor 50 is being driven.

When the drive current flows through the motor driver IC 61, the temperature TT as detected by the first thermistor 62 rises. When the temperature TT reaches a temperature Y, which is a threshold, at time Q, the motor driving device 2 stops driving the motor 50. The threshold temperature Y is set to correspond to the temperature that will be detected by the first thermistor 62 when the temperature TM reaches near the rated temperature T of the motor 50. In other words, if the temperature TT reaches the threshold temperature Y, it can be estimated that the temperature TM has reached a temperature close to the rated temperature T. After the driving of the motor 50 is stopped, the temperature TM stops rising since the motor driving current no longer flows. Accordingly, the motor driving device 2 can control the motor 50 so that the temperature TM does not to reach or exceed the rated temperature T. According to this configuration, since it is not necessary to directly attach a temperature sensor to the motor 50, it is not necessary to use a flexible substrate or the like for connecting the temperature sensor for the motor 50 to the main substrate 60. This simplifies the configuration of the motor driving device 2.

The threshold or the threshold temperature Y can be predetermined based on the various components used in the thermal printer 1 and design conditions such as a current draw of the motor 50, a position of the first thermistor 62 with respect to the motor 50, and the like. For example, the threshold is set based on experimental data obtained by performing an experiment in which the thermal printer 1 is operated in a controlled ambient environment temperature.

Figure 5:
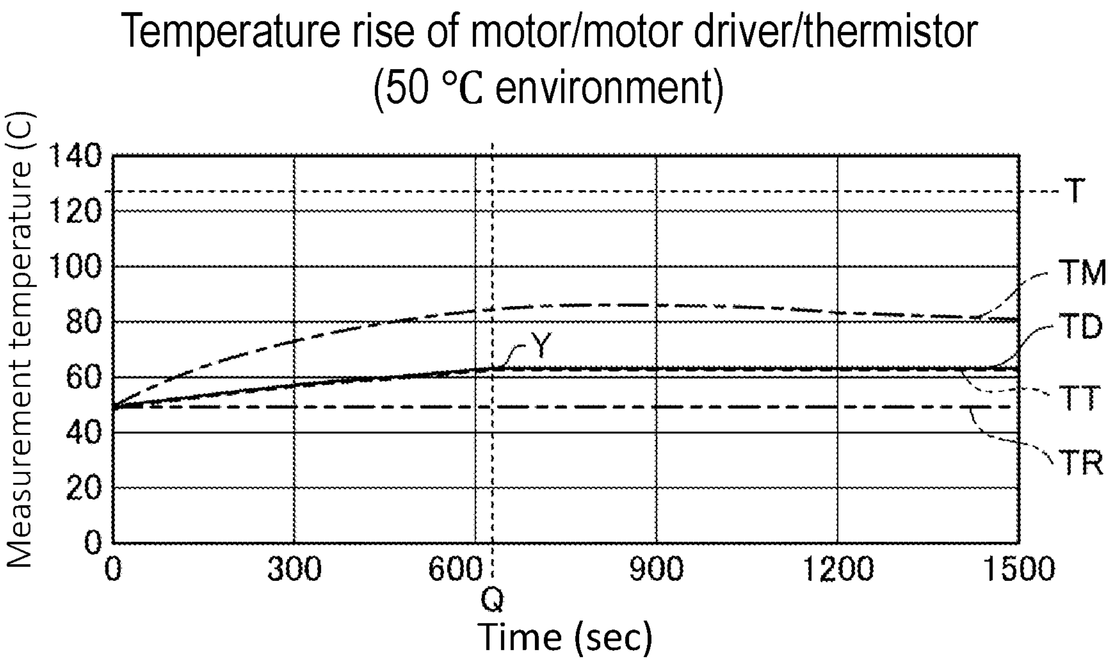
FIG. 5 depicts temperature changes in a thermal printer according to an embodiment under another ambient temperature environment.

FIG. 5 shows example temperature changes when the temperature of a room in which the thermal printer 1 is being used is 50° C. That is, the ambient environment temperature for the thermal printer 1 is 50° C. in this example. In this case, time QA from the start of the operation of the motor 50 until the temperature TT detected by the first thermistor 62 reaches the threshold temperature Y is shorter than the time Q when the ambient environment temperature is 25° C. shown in FIG. 4.

The ambient environment temperature has less influence on the motor 50 than on the first thermistor 62. Therefore, the temperature TM of the motor 50 estimated from the temperature TT detected by the first thermistor 62 becomes higher than the actual temperature of the motor 50. Accordingly, when the temperature TT reaches the threshold temperature Y, the temperature TM is considerably lower than the rated temperature T. This way, even though the temperature TM of the motor 50 is still at an operable temperature, the operation of the motor 50 will be stopped to secure a sufficient safety margin.

Although the configuration of the motor driving device 2 can be simplified by controlling the driving of the motor 50 based on the temperature TT detected by the first thermistor 62 according to the present embodiment, there may be room for further improvement in terms of the operation performance of the thermal printer 1. In the thermal printer 1 according to another embodiment, in order to achieve the further improvement of the operation performance, a threshold correction is performed in which the threshold temperature of the first thermistor 62 is adjusted/changed according to the actual ambient environment temperature.

Figure 6:
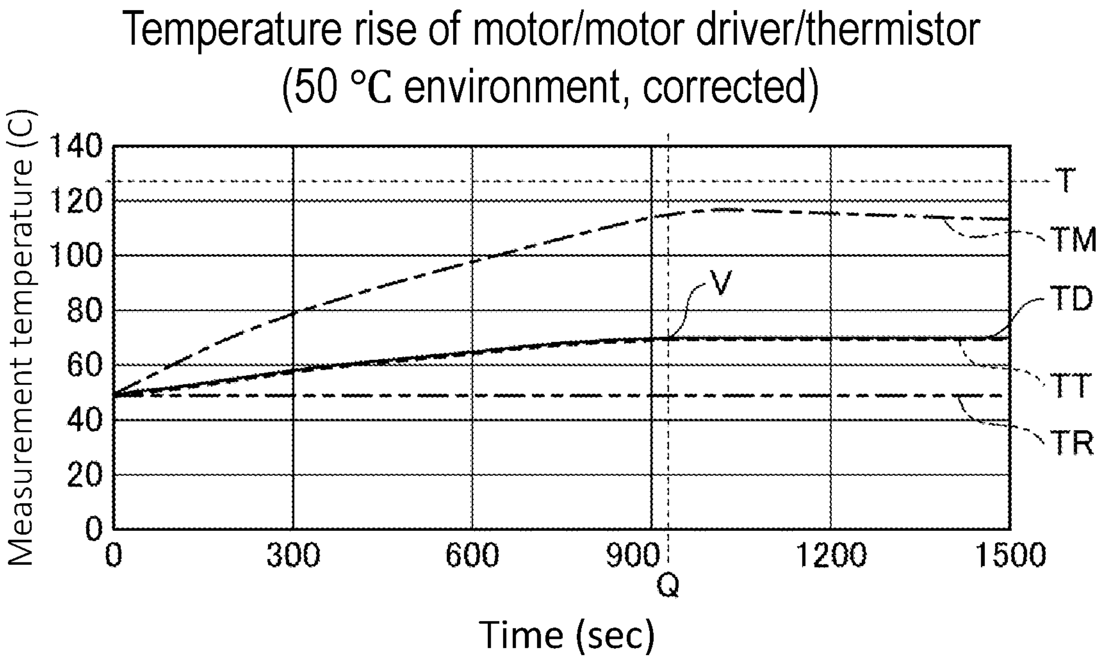
FIG. 6 depicts temperature changes in a thermal printer if a threshold correction is performed according to an embodiment.

FIG. 6 shows example temperature changes in the thermal printer 1 that performs the threshold correction. The ambient environment temperature in this example is the same as that of FIG. 5, 50° C.

As shown in FIG. 6, a threshold temperature V of the first thermistor 62 is higher than the threshold temperature Y shown in FIGS. 4 and 5. The threshold temperature V corresponds to the temperature detected by the first thermistor 62 when the temperature of the motor 50 reaches a temperature close to the rated temperature T under the condition that the ambient environment temperature is 50° C. This threshold temperature V is also predetermined by experiment in a similar manner to the experiment for predetermining the threshold temperature Y.

When the temperature TT detected by the first thermistor 62 reaches the threshold temperature V, the motor driving device 2 stops driving the motor 50. At this time, the temperature TM of the motor 50 is closer to the rated temperature T. As a result, time QB from the start of operation to the stop of the motor 50 becomes longer than the time QA shown in FIG. 4. That is, compared with the case illustrated in FIG. 4, the operable time of the motor 50 can be further extended, and the operation performance can be improved more.

Figure 7:
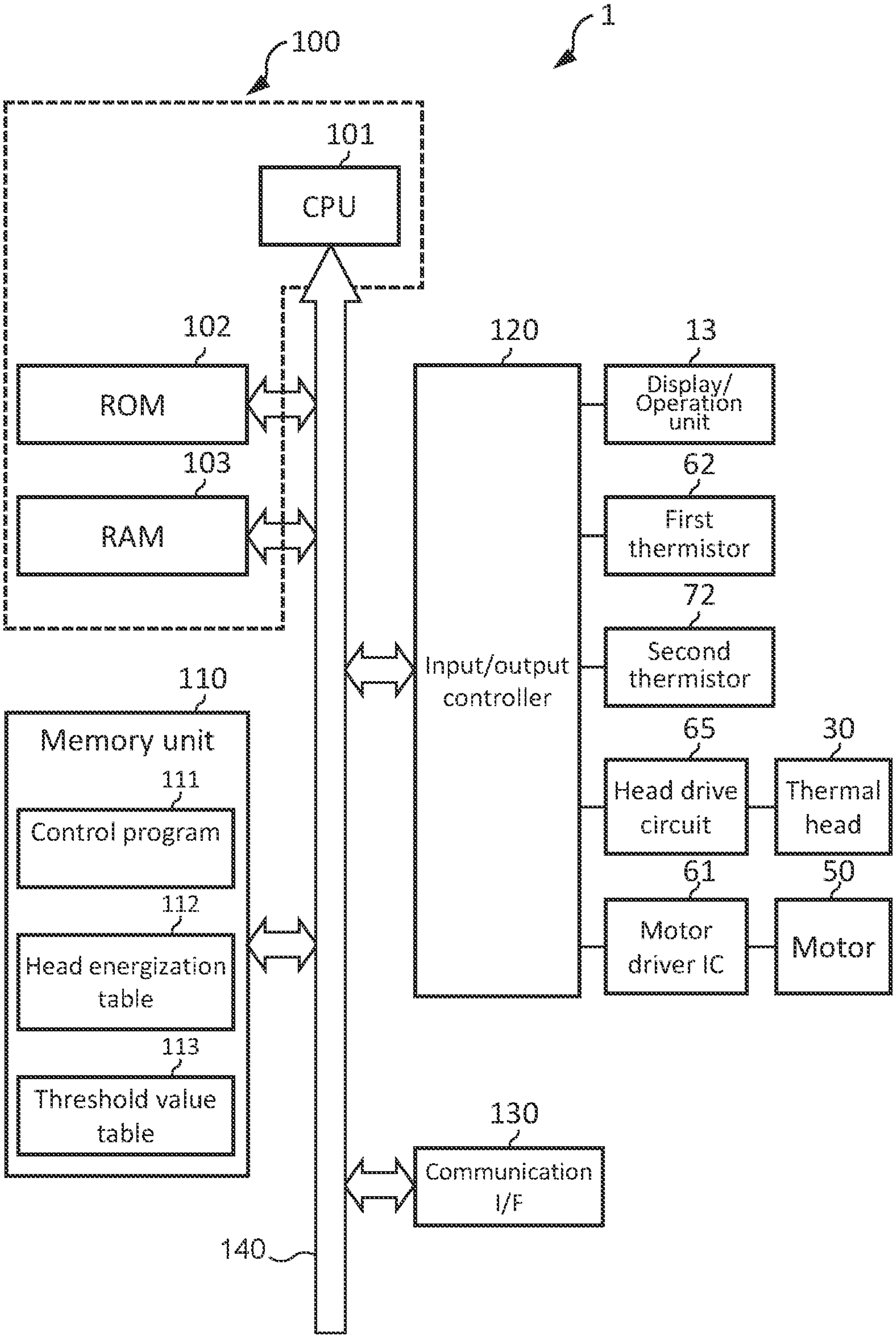
FIG. 7 is a block diagram of a thermal printer according to an embodiment.

FIG. 7 is a block diagram of an example configuration of the thermal printer 1. The thermal printer 1 includes a control unit 100, a memory unit 110, an input/output controller 120, and a communication Interface (I/F) 130, or the like. The control unit 100, the memory unit 110, the input/output controller 120, and the communication I/F 130 are connected to each other via a bus 140.

The control unit 100 functions as or can be a computer comprising a central processing unit (CPU) 101, a read-only memory (ROM) 102, and a random-access memory (RAM) 103. The CPU 101, the ROM 102, and the RAM 103 are connected to each other via the bus 140.

The CPU 101 controls operations of the thermal printer 1. The ROM 102 stores various programs such as a program used for driving the CPU 101 and various data. The RAM 103 is used as a work area of the CPU 101 and loads various programs and various date stored in the ROM 102 or the memory unit 110. The control unit 100 executes various control processes of the thermal printer 1 by operating the CPU 101 according to a control program stored in the ROM 102 or the memory unit 110 and expanded in the RAM 103.

The memory unit 110 is a storage device including a rewritable nonvolatile storage medium such as a hard disk drive (HDD), a solid-state memory (SSD), or a flash memory. The memory unit 110 includes a control program unit 111, a head energization table unit 112, and a threshold table unit 113. The control program unit 111 stores the control program for the operation of the thermal printer 1 and other various control programs as needed.

The head energizing table unit 112 stores a head energizing table. FIG. 8 shows an example data configuration of the head energizing table. The energization head table holds temperature ranges (or predetermined ranges of the temperatures TR) of the second thermistor 72 and energization time durations of the heat generation elements of the thermal head 30 in association with each other. In the example, the temperature ranges held in the table are those of the ambient environment where the thermal head 30 as well as the motor 50 are being used in the housing 10 of the thermal printer 1 and are predetermined by experiment or based on usage history data or the like. The energization time durations held in the table fall within a predetermined time required for the thermal head 30 to print one line of a character or a figure based on the print data and are predetermined for the respective predetermined temperature ranges by the experiment or the like. In the example table, the energizing time durations satisfy A<B<C for the respective temperature TR ranges, and the higher the ambient environment temperature is, the shorter the energizing time duration is. That is, as the temperature TR increases, the energizing time durations A, B, and C decrease in that order. Based on these data in the head energizing table stored in the energizing table unit 112, the appropriate energization time duration of the heat generation elements of the thermal head 30 is selected when the temperature TR, that is the ambient environment temperature, is detected by the second thermistor 72. Accordingly, since the temperature of the heat generation elements of the thermal head 30 in the thermal printer 1 is uniformized regardless of the temperature of the ambient environment where the thermal head 30 and the motor 50 are being used, the thermal printer 1 can achieve a uniform printing quality at various ambient environment temperatures.

The threshold table unit 113 stores a threshold table. FIG. 9 shows an example data configuration of the threshold table. The threshold table holds temperature ranges (or predetermined ranges of the temperature TR) of the second thermistor 72 and threshold data of the temperature TT of the first thermistor 62 in association with each other. When the first thermistor 62 detects a temperature equal to or higher than the threshold, the motor driving device 2 stops driving the motor 50. The thresholds temperatures in the example table are predetermined by experiment or based on usage history data or the like such that they satisfy $Z<Y<X<W<V$ for the respective temperature TR ranges that are also predetermined by experiment or the like, and the higher the ambient environment temperature is, the higher the threshold is. That is, as the temperature TR increases, the threshold temperatures Z, Y, X, W, and V increase in that order. Based on these data in the threshold table stored in the threshold table unit 113, the appropriate threshold is selected when the temperature TR is detected by the second thermistor 72. In another example, the correspondence relationship between the temperature TR of the second thermistor 72 and the threshold for the temperature TT of the first thermistor 62 may be determined more finely.

Returning to FIG. 7, the input/output controller 120 is connected to the display/operation unit 13, the first thermistor 62, the second thermistor 72, the head drive circuit 65, and the motor driver IC 61. The head drive circuit 65 is connected to the thermal head 30 and controls energization of the heat generation elements of the thermal head 30 to control driving of the thermal head 30. The motor driver IC 61 is connected to the motor 50 and includes the drive circuit to drive the motor 50. The input/output controller 120 has both a function as an input/output interface for hardware connected thereto and a function for controlling the hardware. Via the input/output controller 120, the control unit 100 transmits and receives information and data to and from the display/operation unit 13, the first thermistor 62, the second thermistor 72, the head drive circuit 65, and the motor driver IC 61, and controls these units and components according to the stored control programs or based on instructions received from an external personal computer (PC) or the like. The communication I/F 130 is an interface for communication with the PC or the like, such as print instruction communication between the PC and the thermal printer 1.

Figure 10:
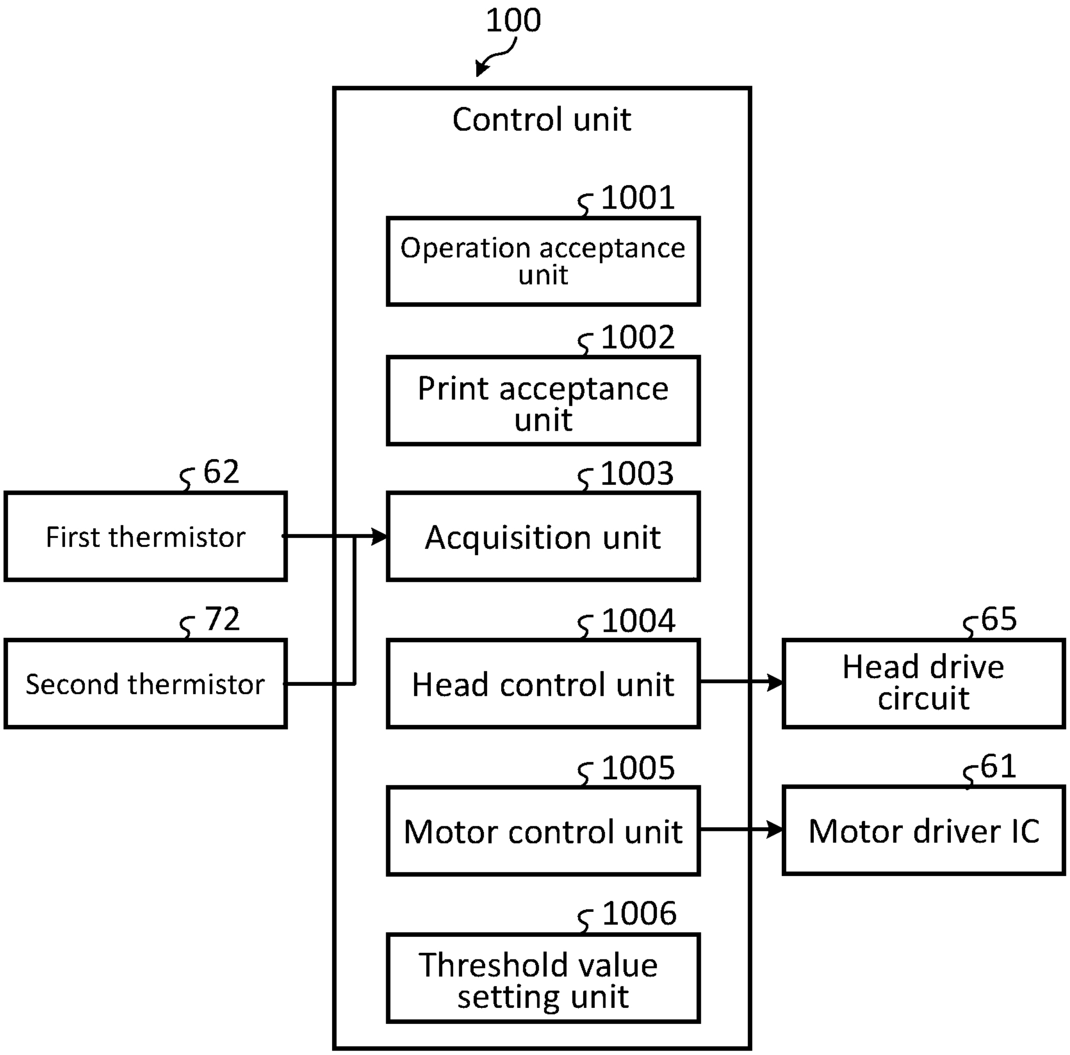
FIG. 10 is a block diagram of a control unit of a thermal printer according to an embodiment.

FIG. 10 is a block diagram of an example configuration of the control unit 100 of the thermal printer 1. The control unit 100 functions as an operation acceptance unit 1001, a print acceptance unit 1002, an acquisition unit 1003, a head control unit 1004, a motor control unit 1005, and a threshold setting unit 1006 when the CPU 101 operates according to the control program stored in the ROM 102 or the control program unit 111 of the memory unit 110. These functions may be configured by software, hardware, or a combination of software and hardware.

The operation acceptance unit 1001 receives an operation signal from the display/operation unit 13. For example, the operation acceptance unit 1001 receives an operation signal corresponding to pressing or switching of the power switch 21, the paper feed button 22, the pause button 23, or the like as entered via the display/operation unit 13 by a user of the thermal printer 1.

The print acceptance unit 1002 receives a print instruction and print data corresponding to the print instruction from an external PC or the like. Once the print instruction and the print data are accepted, the control unit 100 performs the control process for printing. For example, the control unit 100 controls the thermal head 30 and the motor 50 to perform the printing based on the accepted print instruction and print data.

The acquisition unit 1003 acquires temperature information indicating a measured temperature from the first thermistor 62 and the second thermistor 72. For example, when the thermal printer 1 is powered on, temperature information is sent from both the first thermistor 62 and the second thermistor 72 to the acquisition unit 1003 at predetermined intervals. The temperature information from the first thermistor 62 and the second thermistor 72 is then used by the head control unit 1004 and the motor control unit 1005 for the printing control process.

The head control unit 1004 controls a drive circuit that drives the thermal head 30 based on the output of the second temperature sensor. The head control unit 1004 is one example of a thermal head controller. For example, the head control unit 1004 controls the head drive circuit 65 to proceed with the printing based on the print data received by the print acceptance unit 1002, and controls the energization time of the heat generation elements based on the temperature information from the second thermistor 72. More specifically, when the print acceptance unit 1002 receives a print instruction and print data, the head control unit 1004 reads, from the head energization table unit 112 (see FIGS. 7 and 8), the energization time for the heat generation elements of the thermal head 30 corresponding to one of the temperature range in which the detected temperature TR from the second thermistor 72 falls. The head control unit 1004 then controls the head drive circuit 65 to energize the thermal head 30 for the duration of the energization time as read.

The motor control unit 1005 controls a motor drive circuit that drives the motor 50 based on the outputs of both the first temperature sensor and the second temperature sensor. Specifically, the motor controller 1005 controls the motor driver IC 61 to convey the sheet P for printing based on the print data received by the print receiver 1002, and a comparison of the detected temperature from the first thermistor 62 to the threshold temperature that has been set based on the detected temperature from the second thermistor 72 according to the threshold table of the threshold table unit 11 (see FIGS. 7 and 9).

In the case where the temperature information from the first thermistor 62 indicates the temperature TT is equal to or higher than the threshold temperature, the motor control unit 1005 controls the motor driver IC 61 to stop the driving of the motor 50. After the motor 50 is stopped, if the temperature information from the first thermistor 62 indicates the detected temperature TT is now below the threshold, the motor control unit 1005 controls the motor driver IC 61 to resume driving the motor 50 after an elapse of a predetermined time. After the motor 50 is stopped, the driving of the motor 50 will generally not be immediately resumed even if the temperature TT decreases below the threshold. The driving of the motor 50 will be resumed only after the elapse of some predetermined time period after the that the temperature of the motor 50 has sufficiently decreased. This way, the motor 50 can be operated in a more stable state.

The threshold temperature to be used for the comparison to the temperature TT by the motor control unit 1005 may be set by the threshold setting unit 1006. That is, the threshold correction can be performed by the threshold setting unit 1006 where the threshold temperature will be changed according to the output from the second temperature sensor 72. For example, the threshold setting unit 1006 reads, from the threshold table unit 113 (or the threshold table stored therein), the threshold corresponding to one of the temperature ranges in which the detected temperature TR from the second thermistor 72 falls and sets the read threshold as the threshold to be used for the comparison with the detected temperature TT from the first thermistor 62. The threshold setting unit 1006 performs the threshold correction before the start of the printing.

Figure 11:
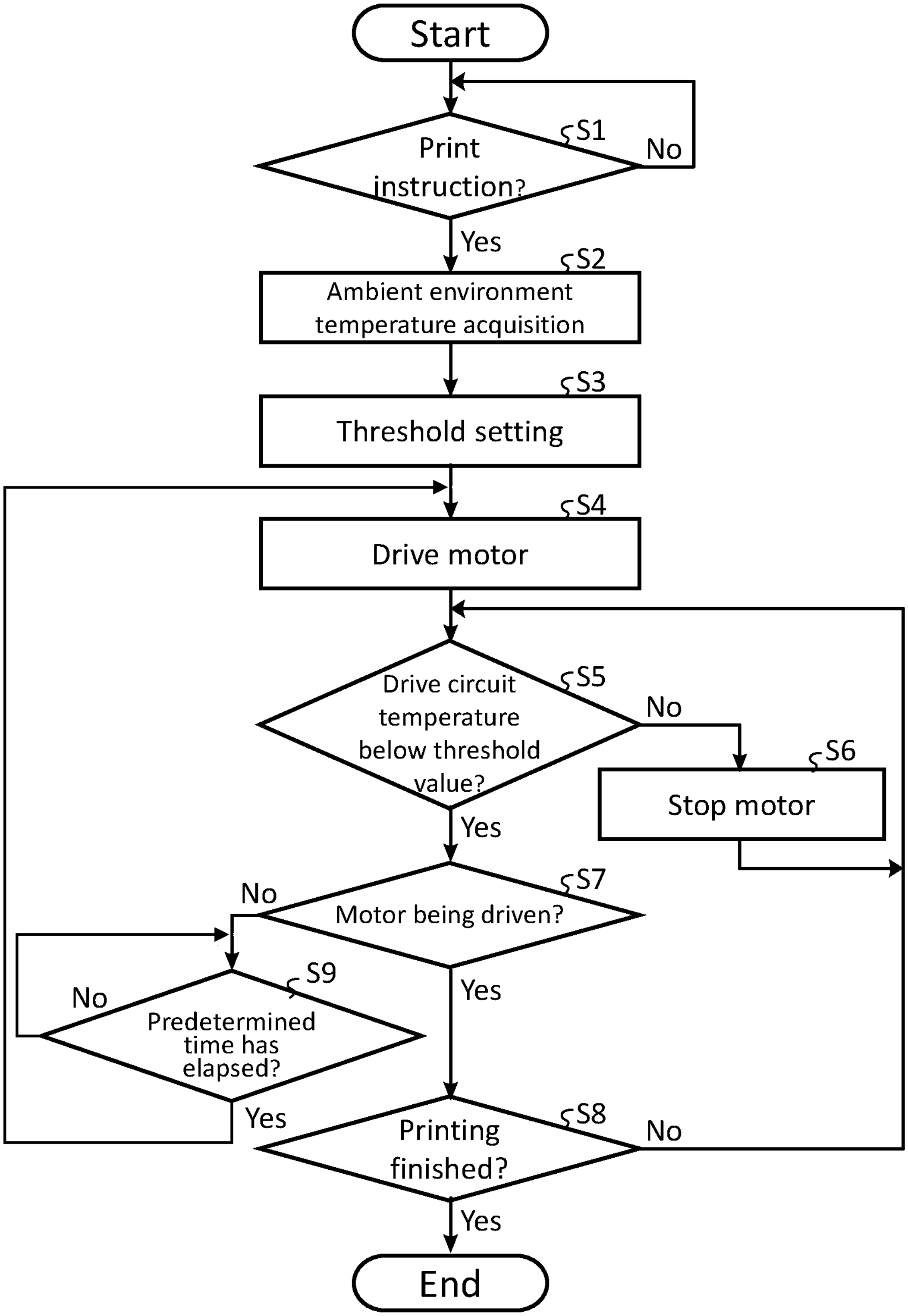
FIG. 11 is a flowchart of motor control processing according to an embodiment.

FIG. 11 is a flowchart of motor control processing by the control unit 100 during the printing operation of the thermal printer 1.

First, the control unit 100 determines whether the print acceptance unit 1002 has accepted a print instruction together with print data from an external PC or the like via the communication I/F 130 (S1). If the print instruction has not been accepted (No in S1), the control unit 100 stays in a waiting state. When the print acceptance unit 1002 has received a print instruction (Yes in S1), the acquisition unit 1003 acquires the temperature information indicating the detected temperature in the housing 10 as the ambient environment temperature from the second thermistor 72 (S2).

Subsequently, the threshold setting unit 1006 reads, from the threshold table unit 113 (or the threshold table stored therein), the threshold (or the threshold temperature) corresponding to the detected temperature included in the temperature information from the second thermistors 72 and sets the read threshold as the threshold to be used for comparison with the detected temperature from the first thermistors 62 (S3). Then, the motor control unit 1005 controls the motor driver IC 61 to drive the motor 50 to convey the sheet P for printing based on the accepted print date (S4).

During the printing operation after the start of the motor 50, the motor control unit 1005 compares the temperature information acquired from the first thermistor 62 to the threshold temperature value set by the threshold setting unit 1006 (S5). The comparison can be performed at a predetermined interval, for example, every 30 seconds. When the temperature of the motor driver IC 61 is not below the threshold (No in S5), that is, when the temperature of the motor driver IC 61 reaches or exceeds the threshold, the motor control unit 1005 controls the motor driver IC 61 to stop the operation of the motor 50 (S6). Then, the control unit 100 returns to the S5 process.

In the process of S5, if the temperature information from the first thermistor 62 indicates the detected temperature is below the threshold (Yes in S5), the motor control unit 1005 then determines whether the motor 50 is presently being driven (e.g., being supplied with power) (S7).

If the motor 50 is being driven (Yes in S7), the control unit 100 next determines whether the printing job has finished (S8). For example, the control unit 100 determines whether the sheet P printed by the thermal head 30 has been discharged from the sheet discharge port 18 in order to determine the present status of the printing process. In a case where the printing has finished (Yes in S8), the control unit 100 ends the motor control processing for the print operation. In a case where the printing has not finished (No in S8), the control unit 100 returns to the process in S5.

After the S7 process, if the motor 50 is not presently being driven, that is, the motor 50 is in the stopped state, the control unit 100 next determines whether a predetermined time has elapsed since the motor 50 was stopped (S9). If the predetermined time has not yet elapsed (No in S9), the control unit 100 waits until the predetermined time elapses. If the predetermined time has elapsed (Yes in S9), the control unit 100 considers that the temperature of the motor 50 has decreased sufficiently and returns to the motor driving process of S4.

In this manner, every time a print instruction is received, the control unit 100 executes the motor control processing during the print operation. In some examples, the motor control processing need not be executed for every print instruction that is received but may instead be executed every time certain type of print data is printed or for a predetermined print range, for example every time a full page of data is printed.

The motor driving device 2 of the present embodiment includes a main substrate (or the main board) 60 connected to a motor 50 via a first wiring 51 and a thermistor substrate (or the thermistor board) 70 connected to the main substrate 60 via a second wiring 71. The motor driving device 2 incorporates, on the main substrate 60, the motor driver IC 61 for driving the motor 50 and the first thermistor 62 for detecting the temperature of the motor driver IC 61 as well as, on the thermistor substrate 70, the second thermistor 72 for detecting the temperature of the ambient environment where the motor 50 is being used. The motor driving device 2 may further incorporates the control unit 100 shown in FIGS. 7 and 10 for controlling the motor driver IC 61 based on the outputs from the first thermistor 62 and the second thermistor 72. The control unit 100 may be configured by software, as hardware, or a combination of software and hardware. By providing the first thermistor 62 on the main substrate 60 to indirectly detect the temperature of the motor 50 and controlling the motor driver IC 61 accordingly, it is possible to prevent the motor 50 from exceeding the rated temperature T. Furthermore, since a flexible substrate or the like for electrically connecting the first thermistor 62 to the main substrate 60 is not required, the configuration of the thermal printer 1 can be simplified, and an increase in manufacturing cost can be avoided.

Further, the control unit 100 of the motor driving device 2 includes the motor control unit 1005 that stops the driving of the motor 50 in the case where the temperature detected by the first thermistor 62 reaches or exceeds the threshold, and the threshold setting unit 1006 that sets the threshold according to the output of the second thermistor 72. Therefore, the operable time of the motor 50 can be further extended even if the motor 50 is operated under various ambient environments with differing temperatures. This improves the operation performance of the motor 50 of the thermal printer 1.

These advantages achieved by the motor driving device 2 in connection with the motor 50, such as the sheet conveyance motor, can advance the overall performance of the thermal printer 1 according to the present embodiment. In other embodiments, the motor driving device 2 can be installed in other electronic apparatuses that include a motor or motors and achieve substantially the same advantages as those in the case of the thermal printer 1.

The control unit 100 of the motor driving device 2 installed in the thermal printer 1 includes a head control unit 1004 that controls the head drive circuit 65 of the thermal head 30 according to the output of the second thermistor 72, which is provided to set the threshold value for the first thermistor 62. This second thermistor 72 serves as both the temperature sensor for setting the threshold for the first thermistor 62 and the temperature sensor for controlling the driving of the thermal head 30. Therefore, the configuration of the thermal printer 1 can be simplified.

The threshold setting unit 1006 included in the control unit 100 sets the threshold for the first thermistor 62 before the printing operation, that is, before the driving of the thermal head 30 and the motor 50 starts. Therefore, in setting this threshold value, the second thermistor is less likely to be affected by heat generated by the thermal head 30 and the motor 50. Consequently, the ambient environment temperature can be detected more accurately by the second thermistor 72, and the control by the motor control unit 1005 can be performed more appropriately.

The control program executed by the thermal printer 1 may be recorded on a non-transitory computer-readable recording medium such as a CD-ROM. The program executed by the thermal printer 1 may be stored on a computer connected to a network, such as the Internet, and downloaded via the network, or may be accessed via the network, such as the Internet.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A thermal printer, comprising:

a motor configured to convey a sheet for printing;

a thermal head configured to perform printing on the sheet;

a first substrate connected to the motor via a first wiring;

a second substrate connected to the first substrate via a second wiring;

a motor drive circuit on the first substrate;

a first temperature sensor on the first substrate, the first temperature sensor being positioned to detect a first temperature of the motor drive circuit;

a second temperature sensor, the second temperature sensor being on the second substrate and configured to detect a second temperature of an ambient environment where the motor is being used; and a motor controller configured to:

set a first threshold value for the detected first temperature based on the detected second temperature, control the motor drive circuit based on the first temperature detected by the first temperature sensor and the second temperature detected by the second temperature sensor, and stop driving of the motor when the detected first temperature reaches or exceeds the first threshold value.

2. The thermal printer according to claim 1, further comprising:

a thermal head controller configured to control a thermal head drive circuit based on the second temperature detected by the second temperature sensor.

3. The thermal printer according to claim 2, wherein the thermal head drive circuit is on the first substrate.

4. The thermal printer according to claim 2, wherein the thermal head controller controls the thermal head drive circuit according to a head energizing table that stores a plurality of predetermined head energization time durations of the thermal head drive circuit and a plurality of predetermined ranges of the second temperature in association with each other.

5. The thermal printer according to claim 4, wherein the head energization time durations decrease as the second temperature increases.

6. The thermal printer according to claim 1, wherein the motor controller sets the first threshold before the printing on the sheet based on received print data begins.

7. The thermal printer according to claim 1, further comprising:

a housing covering the motor, the thermal head, the first substrate, and the motor controller, wherein the second temperature sensor is spaced away from the motor drive circuit within the housing.

8. The thermal printer according to claim 1, wherein the motor controller selects the first threshold value based on a threshold table that stores different threshold values for different temperature ranges.

9. The thermal printer according to claim 8, wherein the motor controller selects the first threshold value from the threshold table based on an initial second temperature.

10. A thermal printer, comprising:

a motor configured to convey a sheet for printing;

a thermal head configured to perform printing on the sheet;

a thermal head controller configured to control heating of the thermal head;

a first substrate connected to the motor via a first wiring;

a motor drive circuit on the first substrate;

a first temperature sensor on the first substrate, the first temperature sensor being positioned to detect a first temperature of the motor drive circuit;

a second temperature sensor, the second temperature sensor being positioned to detect a second temperature of an ambient environment where the motor is being used; and a motor controller configured to:

set a first threshold value for the detected first temperature based on the detected second temperature, control the motor drive circuit based on the first temperature detected by the first temperature sensor and the second temperature detected by the second temperature sensor, and stop driving of the motor when the detected first temperature reaches or exceeds the first threshold value, wherein the thermal head controller controls heating of the thermal head according to a head energizing table that stores a plurality of predetermined head energization time durations and a plurality of predetermined ranges of the second temperature in association with each other.

11. The thermal printer according to claim 10, wherein the head energization time durations decrease as the second temperature increases.

12. The thermal printer according to claim 10, further comprising:

a thermal head drive circuit connected to the thermal head controller and the thermal head, the thermal head drive circuit configured to control energization of the thermal head based on control of the thermal head controller.

13. The thermal printer according to claim 12, wherein the thermal head drive circuit is on the first substrate.

14. The thermal printer according to claim 10, wherein the motor controller sets the first threshold before the printing on the sheet based on received print data begins.

15. The thermal printer according to claim 10, further comprising:

a housing covering the motor, the thermal head, the first substrate, and the motor controller, wherein the second temperature sensor is spaced away from the motor drive circuit within the housing.

16. The thermal printer according to claim 10, further comprising:

a second substrate connected to the first substrate via a second wiring, wherein the second temperature sensor is on the second substrate.

* * * * *